United States Patent [19]

Carswell

[11] Patent Number: 4,758,603

[45] Date of Patent: Jul. 19, 1988

[54] DITHIOCARBAMATE INTERNAL MOLD RELEASE AGENTS

[75] Inventor: Robert Carswell, Lake Jackson, Tex.

[73] Assignee: The Dow Chemical Company, Midland, Mich.

[21] Appl. No.: 90,809

[22] Filed: Aug. 28, 1987

[51] Int. Cl.[4] .............................................. C08G 18/14
[52] U.S. Cl. ................................ 521/110; 252/182.17; 264/51; 264/328.1; 264/328.6; 264/328.8; 521/121; 524/723; 528/53
[58] Field of Search ................. 521/110, 121; 524/723; 528/53; 252/182; 264/51, 328.1, 328.6, 328.8

[56] References Cited

U.S. PATENT DOCUMENTS

| | | | |
|---|---|---|---|
| 2,981,719 | 4/1961 | Muhlhausen et al. | 260/75 |
| 3,151,098 | 9/1964 | Watson et al. | 521/121 |
| 3,182,037 | 5/1965 | Nelson | 260/43.75 |
| 3,245,923 | 4/1966 | Manzella et al. | 260/2.5 |
| 3,255,129 | 6/1966 | Ferrari | 260/2.5 |
| 3,432,474 | 3/1969 | Lombardi | 260/77.5 |
| 3,497,457 | 2/1970 | Hurlock et al. | 252/182 |
| 3,884,849 | 5/1975 | Molbert | 260/2.5 |
| 3,925,527 | 12/1975 | Kleimann et al. | 264/53 |
| 3,978,011 | 8/1976 | Molbert | 260/2.5 |
| 3,993,606 | 11/1976 | von Bonin et al. | 260/2.5 |
| 4,024,090 | 5/1977 | von Bonin et al. | 260/2.5 |
| 4,033,912 | 7/1977 | Kleimann et al. | 260/2.5 |
| 4,058,492 | 11/1977 | von Bonin et al. | 260/2.5 |
| 4,076,695 | 2/1978 | Keil | 260/46.5 |
| 4,098,705 | 7/1978 | Sakurai et al. | 252/33.6 |
| 4,098,731 | 7/1978 | von Bonin et al. | 252/2.5 |
| 4,111,861 | 9/1978 | Godlewski | 421/123 |
| 4,125,479 | 11/1978 | Chesluk et al. | 252/33.6 |
| 4,159,206 | 4/1979 | Jourquin et al. | 260/2.5 |
| 4,201,847 | 5/1980 | Kleimann et al. | 521/172 |
| 4,220,727 | 9/1980 | Godlewski | 521/110 |
| 4,281,096 | 7/1981 | Nomura et al. | 528/53 |
| 4,343,339 | 8/1982 | Schwindt et al. | 152/209 |
| 4,396,729 | 8/1983 | Dominquez et al. | 521/51 |
| 4,420,570 | 12/1983 | Dominquez | 521/112 |
| 4,487,912 | 12/1984 | Zimmerman et al. | 528/52 |
| 4,519,965 | 5/1985 | Taylor et al. | 264/51 |
| 4,546,154 | 10/1985 | Robertson | 525/474 |
| 4,581,386 | 4/1986 | Taylor et al. | 521/125 |
| 4,585,803 | 4/1986 | Nelson et al. | 521/105 |
| 4,588,829 | 5/1986 | Pan et al. | 556/38 |

FOREIGN PATENT DOCUMENTS

| | | |
|---|---|---|
| 882922 | 8/1980 | Belgium . |
| WO84/03288 | 1/1984 | PCT Int'l Appl. . |
| 1048982 | 11/1966 | United Kingdom . |
| 1225627 | 3/1971 | United Kingdom . |
| 2101140 | 1/1983 | United Kingdom . |

OTHER PUBLICATIONS

Copending U.S. application Ser. Nos. 749,849, 749,850 and 749,710 filed 6-28-85 by Meyer et al. entitled Internal Mold Release Compositions.

Copending U.S. application Ser. No. 040,463 filed 4-20-87 by Nelson et al., entitled Internal Mold Release Compositions.

"MIR for RIM", by E. Galli in Plastics Compounding, Nov./Dec. 1984, pp. 24-26.

NTIS document BDX 6132510, "Preparation and Properties of an Internal Mold Release for Rigid Urethane Foam", by B. G. Parker, 8-80.

Chemical Abstract 72:80116s.
Chemical Abstract 77:6515h.
Chem Abstract 81:154136h.
Chem Abstract 83:132669y.
Chem Abstract 92:7429e.
Chem Abstract 92:95674j.
Chem Abstract 94:193194r.
Chem Abstract 95:44159z.
Chem Abstract 96:53594k.
Chem Abstract 96:201081h.
Chem Abstract 98:127531c.
Derwent Abstract 19926Q.
Derwent Abstract 72340S.
Derwent Abstract 18513W/11.
Derwent Abstract 18603 D/11.
Derwent Abstract 89894 D/49.
Derwent Abstract 89895 D/49.
Derwent Abstract 96322 E/45.
Derwent Abstract 16884 E/09.

Primary Examiner—Maurice J. Welsh

[57] ABSTRACT

A method of making a reaction injection molded polyurethane having enhanced mold release properties is provided. An effective amount at least one dithiocarbamate is injected into a mold cavity with at least one a polyisocyanate component and at least one an active hydrogen component.

Polyurethanes having enhanced mold release properties are formed using a composition of matter comprising at least 0.25 parts per hundred parts by weight of active hydrogen components of a dithiocarbamate of the formula:

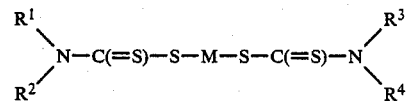

wherein M and the R groups are described herein.

26 Claims, No Drawings

DITHIOCARBAMATE INTERNAL MOLD RELEASE AGENTS

BACKGROUND OF THE INVENTION

This invention generally concerns the field of reaction injection molding of polyurethanes. More specifically, it concerns internal mold release agents useful in reaction injection molding.

Reaction injection molding (RIM) is a process for producing and molding polyurethanes which process has proven especially useful for making large molded objects having resilience such as furniture items; light weight building materials; shoe soles and heels; industrial service parts such as rollers, gears, bearing pads, pump housings; auto body parts such as bumpers, fascia, hoods, doors, and fenders; and the like. RIM may be used in a one shot or a two shot process.

The RIM technique involves filling a mold with a stream of reactive, liquid starting components, which are rapidly injected using an impingement mixing process. The starting components mix by impingement as they are injected into a mixing head, from which they flow rapidly into the mold. On mixing, the components quickly begin to react to form polyurethanes. The mixture should remain fluid for a period of time sufficient to fill the mold, which is often of large volume and complex design. The period of time required to fill the mold is the filling time. The period of time between initial mixing of starting components and the first visible reaction is called cream time. The period of time between initial mixing and formation of sufficient gel to solidify the polyurethane is called gel time. Shortly after gelling, the polyurethane cures to form a molded object having sufficient dimensional stability that it can be removed from the mold, leaving an empty mold for another injection of starting components. The time from injection until such an object is formed is called the demold time. The demold time is but one component of the cycle time, which is a measure of the time from one injection until a RIM machine is ready for the next injection of starting components. Cycle time also includes time necessary for mechanical operations such as opening and closing a mold, time required for mold preparations such as applying external mold release agents, and the like.

Starting components enter the mold, gel, cure and are removed very rapidly. Typically, the mixed stream of components enters the mold at rates of from about 20 to about 1200 pounds per minute (from about 9 to about 545 kilograms per minute). Typical gel times range from less than about one second to about fifteen seconds. Cycle times are typically from about three to about five minutes and with high speed equipment are often less than about two minutes. Every stage of the process is preferably optimized to achieve cycle times which are as short as possible.

When RIM is used in a one shot process of producing polyurethanes, the polyisocyanate starting component is supplied to the mixing head in one stream and the active hydrogen starting component is supplied in another stream. In a two shot process, an isocyanate-containing prepolymer is supplied in one stream while the remaining active hydrogen component is supplied in the other. The stream of polyisocyanate or prepolymer component(s) is referred to as the "A side", or "A component" while the stream containing the active hydrogen component(s) is referred to as the "B side", or "B component." Chain extenders, catalysts, and additives are typically blended and introduced in the B side, but in certain cases can be mixed into the "A side". In some instances a third or fourth stream is required to meter an active ingredient which is incompatible with, prematurely react with or otherwise cause difficulty with one or more of the other components of the polyurethane. Polysiloxane mold release agents and pigments, for instance, are sometimes added in a third or fourth stream. Avoiding use of more than two streams is generally preferred. The term "reaction mixture" as used herein refers to an admixture of at least one polyisocyanate component and at least one hydrogen component which will form a polyurethane. Additives are optionally included in a reaction mixture.

It is important in RIM that starting components be mixed in desired proportions and that they be mixed intimately. It is also important that inclusion of air in the molded product not be in visible bubbles or pockets. The mold must be filled completely. These and other requirements are met by processes known to those skilled in the art. Such processes include processes disclosed in U.S. Pat. Nos. 3,709,640; 3,857,550; 4,218,543; 4,298,701; 4,314,962; 4,582,887, which are incorporated herein by reference. Additional description of RIM processes is found in Prepelka and Wharton, "Reaction Injection Molding in the Automotive Industry," *Journal of Cellular Plastics*, vol. 2, no. 2, pp. 87–98 (1975) and Knipp, "Plastics for Automobile Safety Bumpers," *Journal of Cellular Plastics*, pp. 76–84 No. 2 (1973).

Efficient RIM processes produce the largest possible quantity of molded products in the shortest possible time. Several factors enhance efficiency. Starting components must react quickly and harden or cure into objects which can be removed from the mold without collapsing or losing structural integrity. Speed of reaction must, however, require sufficient time that the mold can be filled before increased viscosity or gelling prevent complete filling of the mold. After the molded products are sufficiently cured to be removed from the mold, efficient processes require rapid removal from the mold. Efficient processes also avoid times in which the molds are not in use, such as maintenance time and the like.

Improvements in formulation of polyurethane components supplied to a RIM apparatus have reduced cure times to less than about 40 seconds. With such low cure times, the time required to remove a molded object from the mold and prepare the mold for the next injection of starting components has come to be one of the more time-consuming steps in a RIM process. Polyurethanes tend to adhere to a mold. Separation of the molded object from the mold is generally facilitated by coating the internal surface of a mold cavity with an agent, referred to herein as an external mold release agent, which prevents the polyurethane from sticking to the surface. Commonly used external mold release agents include waxes, soaps, oils and silicon compounds. Molds are often complex in configuration and must be completely and uniformly covered, usually by spraying a solution or emulsion of the agent onto the mold surface. Typically, this spraying is necessary after the removal of each object or each few objects from the mold. Such spraying requires labor and increases the cycle time by as much as about 50 percent. Uneven spraying often leads to sticking of molded objects in some places and accumulation of excess external mold release agent in others. In addition, repeated spraying results in excess mold release agent building up, especially on surfaces having intricate patterns, where it causes surface defects. Periodic cleaning of the mold typically increases average cycle time an additional 10 to 20 percent. Additionally, mold release agent adheres to the molded object and must be removed before paint and the like will adhere to the object.

Clearly, reducing the need for an external mold release agent could make RIM molding much more efficient. A number of materials have been added to polyurethanes to improve mold release qualities of the polymer. These materials are called internal mold release agents and frequently have a silicon-containing molecular structure, as exemplified by the compositions disclosed in U.S. Pat. Nos. 3,725,105; 3,993,606; 4,024,090; 4,076,695; 4,111,861; 4,220,727; 4,379,100; 4,396,729; and 4,546,154. Many other compositions which have been proposed for use as internal mold release agents for use in RIM include fatty acid structures as exemplified by compositions disclosed in U.S. Pat. Nos. 4,058,492; 4,111,861; 4,130,698; 4,201,847; and 4,254,228. These proposed internal mold release agents have generally found limited application because they have limited compatibility with the starting components used to form polyurethanes or react with some of the components, catalysts or additives.

Many internal mold release agents cannot, therefore, be added in the A or B component streams of a RIM process and require use of a third or fourth stream as explained in U.S. Pat. No. 4,546,154. Use of a third or fourth stream requires specialized equipment and additional material handling. Silicon-based mold release agents are also often difficult to remove from surfaces of molded objects to allow satisfactory adherence of paint and other coatings.

Improving the efficiency of RIM processes by use of an internal mold release agent which aids in removal of a molded object from the mold without substantial build up of the agent on the surfaces of the mold or of the molded object would be desirable. Such an internal mold release agent would preferably be suitable for use in a two stream RIM process.

SUMMARY OF THE INVENTION

The process and compositions of the invention achieve the objectives of providing an efficient internal mold release agent.

In one aspect, this invention is a method of making a reaction injection molded polyurethane having enhanced mold release properties comprising injecting into a mold cavity a formulation comprising:

(a) at least one a polyisocyanate component;

(b) at least one an active hydrogen component; and (c) an amount effective to enhance mold release properties of the polyurethane of at least one dithiocarbamate.

In another aspect, the invention is a composition of matter comprising (a) at least one active hydrogen component; and (b) at least 0.25 parts by weight based on 100 parts of active hydrogen compound of a dithiocarbamate of the formula:

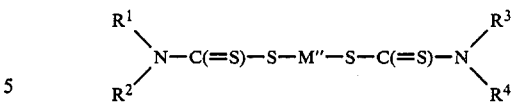

where $R^1$ and $R^4$ are independently selected from the group consisting of hydrogen, alkyl, aryl or alkylaryl groups which are unsubstituted or inertly substituted and have from one to about forty carbon atoms; $R^2$ and $R^3$ are independently selected from the group consisting of unsubstituted or inertly substituted alkyl, aryl and alkylaryl groups of one to about forty carbon atoms, and $M''$ is selected from the group consisting of alkylene groups, arylene groups, alkylarylene groups, substituted metal atoms and metal atoms selected from the group consisting of selenium, molybdenum, antimony, copper, lead, zinc and mixtures thereof.

DETAILED DESCRIPTION OF THE INVENTION

The mold release additives of the invention are dithiocarbamates, generally dithiocarbamates selected from the group consisting of metal dithiocarbamates, substituted metal dithiocarbamates, alkylene dithiocarbamates, arylene dithiocarbamates, alkylarylene dithiocarbamates and mixtures thereof. Dithiocarbamates are compounds having a

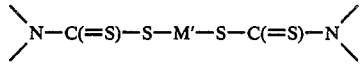

functional group in the molecule, where $M'$ is selected from the group consisting of metal atoms, substituted metal atoms, alkylene groups, arylene groups, and alkylarylene groups.

Any metal atom having a valence of at least two is suitable for use as $M'$. Such metals include nickel, molybdenum, selenium, antimony, copper, lead, zinc and the like. When $M'$ is a metal atom, the compounds are referred to herein as metal dithiocarbamates. Alternatively, in the case of substituted metal dithiocarbamates, $M'$ is a metal atom having a valence greater than two and having bonded thereto at least one oxygen or sulfur atom. Substituted metal atoms include metal atoms having at least one oxygen atom bonded thereto, metal atoms having at least one sulfur atom bonded thereto, and metal atoms having both at least one oxygen atom and at least one sulfur atom bonded thereto. Suitable metal atoms having a valence greater than two in at least one possible oxidation state include molybdenium, selenium, niobium, tantalum, and the like. Such substituted metal dithiocarbamates are prepared by the process described in U.S. Pat. No. 4,098,705 which is incorporated herein by reference.

Alkylene groups suitable as $M'$ are divalent alkylene groups including methylene groups, ethylene groups, propylene groups and the like. Dithiocarbamates having such alkylene groups are referred to herein as alkylene dithiocarbamates, specifically as methylene dithiocarbamates, ethylene dithio carbamates, propylene dithiocarbamates and the like, respectively. $M'$ is, alternatively, a divalent arylene group such as para-phenylene, meta-phenylene, 4,4'-diphenylene groups and the like, in which case the dithiocarbamates are referred to herein as arylene dithiocarbamates. Alkylarylene groups suitable as M' include such divalent groups as —CH$_2$—C$_6$H$_4$—CH$_2$—, —CH$_2$—CH$_2$—C$_6$H$_4$—CH$_2$—CH$_2$—, —CH$_2$—C$_6$H$_4$—C$_6$H$_4$—CH$_2$— and the like. Dithiocarbamates having alkylarylene groups are referred to herein as alkylarylene dithiocarbamates.

Dithiocarbamates particularly useful in the practice of the invention include those of the formula:

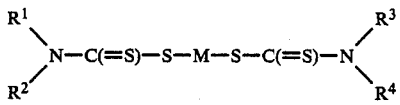

where R$^1$ and R$^4$ are independently selected from the group consisting of hydrogen, alkyl, aryl or alkylaryl groups which are unsubstituted or inertly substituted and have from one to about forty carbon atoms; R$^2$ and R$^3$ are independently selected from the group consisting of unsubstituted or inertly substituted alkyl, aryl and alkylaryl groups of from one to about forty carbon atoms, and M is selected from the group consisting of alkylene groups, arylene groups, alkylarylene groups, substituted metal atoms and metal atoms selected from the group consisting of selenium, molybdenium, antimony, copper, lead, zinc, and mixtures thereof. M is preferably a metal atom selected from the group consisting of antimony, copper, lead, zinc and mixtures thereof.

In Formula I, R$^1$, R$^2$, R$^3$, and R$^4$ are each suitably straight or branched chain alkyl groups of one to about forty carbon atoms such as methyl, ethyl, propyl, isopropyl, butyl, secondary butyl, tertiary butyl, n-pentyl, neopentyl, n-hexyl, n-decyl, n-dodecyl, 2-hexyldecyl, n-pentadecyl, n-eicosyl, 2-t-butyldecyl groups and the like. The alkyl groups are optionally substituted with groups which do not undesirably interfere with polyurethane formation. Groups which do not interfere with polyurethane formation are referred to herein as inertly substituted groups, although it is recognized as the substituents which aid in polyurethane formation or are involved in polyurethane formation may be used. Such groups include halogens such as chloride, nitro groups, thio ethers, ethers and the like. Examples of suitable inertly substituted alkyl groups include 2-nitroamyl, 4-bromobutyl, 3-chloropentyl and the like. Alternatively, the groups R$^1$, R$^2$, R$^3$ and R$^4$ are each aryl groups of one to forty carbon atoms such as benzyl, phenyl, naphthyl, and the like. The aryl groups are optionally substituted with groups which do not interfere undesirably with polyurethane formation under reaction conditions. Such groups include halogens such as chlorine, nitro groups, thioethers, ethers, and the like. Examples of such substituted groups include 2-nitronaphthyl, methoxyphenyl, 2,3-dichlorophenyl and the like. Alternatively, the groups R$^1$, R$^2$, R$^3$ and R$^4$ are alkylaryl groups of from one to forty carbon atoms such as ortho-tertiary butyl phenyl, 2,4-diethylphenyl, methylnaphthyl, and the like. The alkylaryl groups are optionally substituted with inert groups like those with which alkyl and aryl groups may be substituted.

Groups R$^1$, R$^2$, R$^3$ and R$^4$ are selected independently, that is all four groups are suitably the same or, optionally, each is different from one or more of the others. For instance, one or more of R$^1$, R$^2$, R$^3$ or R$^4$ is suitably alkyl while one or more of the others is aryl or, optionally, alkylaryl. R$^1$ and R$^4$ are independently optionally hydrogen. When either or both of R$^1$ and R$^4$ are hydrogen, R$^2$ and R$^3$ are preferably independently selected from the group consisting of alkyl, aryl and alkylaryl groups described above which have from about four to about forty carbon atoms, such as t-butylphenyl, naphthyl, neopentyl, n-heptyl, dodecyl, ethylbenzyl groups and the like. In many applications dithiocarbamates having longer carbon chains in the R groups thereof are more effective as internal mold release agents than are similar dithiocarbamates having shorter carbon chains in the R groups thereof. The metal atom, M, in Formula I is selected from the group consisting of zinc, antimony, lead, copper and mixtures thereof. M is preferably zinc or antimony and is more preferably antimony.

Compounds corresponding to Formula I and suitable for use in the practice of the invention include: zinc di(di-n-butyl) dithiocarbamate, zinc di-t-butyl dithiocarbamate, antimony di-n-amyl dithiocarbamate, copper butyl amyl dithiocarbamate, lead dicyclohexyl dithiocarbamate, antimony dilauryl dithiocarbamate, zinc di(benzyl stearyl) dithiocarbamate, and the like.

The dithiocarbamate mold release agents of the invention are suitably used singly or in combinations of dithiocarbamates having different organic substituents R$^1$, R$^2$, R$^3$ and R$^4$ and/or having different metal atoms. Dithiocarbamate mold release agents are also suitably useful in combination with other mold release agents such as silicon-containing compounds and salts of carboxylic acids described in U.S. Pat. No. 4,585,803, which is incorporated herein by reference.

Dithiocarbamates suitable for use in the practice of the invention are well known. Various dithiocarbamates are commercially available. Dithiocarbamates are suitably produced by the reaction of primary or secondary amines with carbon disulfide and a metal hydroxide. The amine and carbon disulfide are reacted before the addition of metal hydroxide, or, optionally the amine and carbon disulfide are reacted in the presence of the metal hydroxide. For instance, diamyl amine, carbon disulfide, and zinc hydroxide are reacted simultaneously to form zinc diamyldithiocarbamate. Details of processes are disclosed in U.S. Pat. Nos. 2,450,633; 2,492,314; 2,580,274; 3,182,037; 3,245,923; 3,391,091; and 4,588,829, which patents are incorporated by reference. Amines suitable for making dithiocarbamates of the invention include such alkyl amines as stearyl amine, distearylamine, butyl amine, butyl amyl amine and the like, as well as aromatic and alkylaromatic amines such as anisidine, chlorophenyl amines, diphenyl amine, tolidene and the like.

The dithiocarbamate mold release agent is suitably used in an amount effective to enhance mold release properties. Polyurethanes having enhanced mold release properties require either less force to demold or less frequent applications of external mold release agents to accomplish demolding than do similar polyurethanes not having enhanced mold release properties. Preferably, at least 5 objects of polyurethane having enhanced mold release properties can be demolded between applications of external mold release agent. More preferably, at least 10, and even more preferably at least 20 molded objects can be demolded between applications of external mold release agent. Preferably, a mold release agent of the invention is used in an amount of at least about 0.25 percent, most preferably in an amount of from about 0.25 to about 10 percent, by weight based on total weight of active hydrogen components used in the B-side of a RIM or other molding apparatus. When dithiocarbamates are used together with other internal mold release agents, less dithiocarbamate is used than would be used when the dithiocarbamate is the only internal mold release agent.

The mold release agents of the invention are preferably mixed with the active hydrogen components, in the B side of the RIM apparatus. They are, alternatively, mixed with the A side components. Dithiocarbamates are generally low viscosity liquids at room temperature. They are generally soluble in polar compounds such as alcohols, glycols, polyols, amines and the like. In a given application, the dithiocarbamate is beneficially selected such that it is soluble or dispersible in a component of the reaction mixture and is not reactive with the component. Some dithiocarbamates are produced and are commercially available as solutions or dispersions in oils, such as hydrocarbon oils and the like. Dithiocarbamates available in such solutions or dispersions are optionally used without removal of the oil when that oil does not interfere with the reactivity or mutual miscibility of components with which the dithiocarbamate is to be mixed.

While the internal mold release agents of this invention alone provide easy release from a mold for a number of molded objects, more efficient operation is achieved by treating the mold surface with small amounts of an external mold release agent known in the art before the initial molding and again periodically, such as after every 5 or more parts are molded, depending on the complexity of the objects being molded and the mold release agent used. Preferably, external mold release is used between at least about 10, more preferably at least 20, objects are molded. Cycle time per molded object is dramatically reduced and the frequency of mold cleaning is similarly reduced. The use of less external mold release agent reduces the amount thereof that adheres to the molded objects.

The internal mold release agents of the invention are suitable for use in polyurethanes. The term, polyurethane, is used generically herein to denote polymers produced by reaction of at least one polyisocyanate starting component and at least one polyfunctional active hydrogen containing starting component. Active hydrogen components are compounds having hydrogen-containing functional groups which will react with an isocyanate group. Active hydrogen-containing compounds include primary and secondary amines, alcohols, thiols, carboxylic acids, carboxamides and the like. The Zerewitnoff test described by Woller in the *Journal of the American Chemical Society*, Vol. 49, page 3181 (1927) predicts the tendency of a hydrogen-containing group to react with isocyanates. Compounds having hydroxyl, or primary or secondary amine functional groups are the active hydrogen compounds most often used in producing polyurethanes. Suitable active hydrogen compounds are generally liquids or solids capable of being melted at relatively low temperatures.

Polyisocyanate starting components have two or more isocyanate groups. Diisocyanates are typically used as polyisocyanate starting components. The choice of starting components, as well as the process by which they are reacted, generally determines the physical properties of a polyurethane.

Production of polyurethanes often involves more than one active hydrogen compound. When two or more active hydrogen components are used, at least one is generally a relatively high equivalent weight active hydrogen containing compound. A relatively high equivalent weight active hydrogen compound generally has an equivalent weight in excess of about 400. Relatively high equivalent weight active hydrogen containing compounds advantageously have average equivalent weights of from about 500 to about 5000, preferably from about 800 to about 3000, and more preferably from about 1000 to about 2500. Desirably, the relatively high equivalent weight active hydrogen containing compound has from about 2 to about 8, more preferably from about 2 to about 3, active hydrogen containing groups per molecule. Active hydrogen components having equivalent weights of less than about 400 used in elastomer and RIM polyurethanes are generally referred to as chain extenders.

Active hydrogen compounds suitable for use in forming polyurethanes include polyols, polyhydric thioethers, polyacetals, polyhydroxyl-containing phosphorus compounds, polyamines, polyamides, polymercaptans, polycarboxylic acids, and the like. Active hydrogen compounds are exemplified by those disclosed in U.S. Pat. No. 3,928,299.

Relatively high equivalent weight active hydrogen compounds most commonly used in polyurethane production are those compounds having at least two hydroxy groups, which compounds are referred to as polyols. Typical polyols include polyester polyols, polyester amide polyols, and polyether polyols having at least two hydroxyl groups. Polyethers and polyesters having hydroxyl terminated chains are preferred for use as relatively high molecular weight active hydrogen containing compounds for use in polyurethanes suitable for use in the practice of the invention. Examples of polyols also include hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers, including polythioethers, acetals, including polyacetals. Active hydrogen compounds other than aliphatic and aromatic polyols, include thiols including polythiols, ammonia and amines (including aromatic, aliphatic and heterocyclic amines, including polyamines and mixtures thereof). Alkylene oxide adducts of compounds having two or more different groups within the above-defined classes are also suitable for formation of polyurethanes; such compounds include amino alcohols, as well as compounds having at least one thiol group and at least one hydroxyl or amine group and the like.

Polyether polyols advantageously employed in the practice of this invention are polyalkylene polyether polyols including the polymerization products of alkylene oxides and other oxiranes, alone, e.g. in the presence of such catalysts as boron trifluoride potassium hydroxide and the like, or initiated by water, polyhydric alcohols having from about two to about eight hydroxyl groups, amines and the like. Illustrative alcohols suitable for initiating formation of a polyalkylene polyether include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, pentatols and hexatols. Sugars such as glucose, sucrose, fructose, maltose and the like as well as compounds derived from phenols such as (4,4'-hydroxyphenyl)2,2-propane, and the like are also suitable polyhydric alcohols for forming polyether polyols useful in the practice of the invention.

Aromatic and aliphatic thiols suitably reacted with alkylene oxides and other oxiranes to form polyether polyols include alkane thiols such as 1,2-ethane dithiol, 1,2-propane dithiol and 1,6-hexane dithiol; alkene thiols such as 2-butene-1,4-dithiol; alkyne thiols such as 3-hexyne-1,6-dithiol; and arene thiols such as 1,4-benzene dithiol and the like. Hydrogen sulfide and thiol-containing polymers such as polyvinylbenzyl thiol and the like are also suitable.

Amines suitable for reaction with oxiranes to form polyether polyols include aromatic amines such as aniline, o-chloroaniline, p-phenylene diamine, 1,5-diaminonaphthalene, methylene dianiline, the condensation products of aniline and formaldehyde, 2,4-diamino toluene and the like; aliphatic amines such as methylamine, triisopropanolamine, isopropanolamine, diethanolamine, ethyenediamine, 1,3-propylenediamine, 1,4-propylene diamine, 1,3-butylenediamine, and the like and mixtures thereof. Amine based polyols are exemplified by those disclosed in U.S. Pat. No. 4,358,547.

Among other compounds suitably condensed with alkylene oxides for formation of polyether polyols are polyhydric thioethers such as thiodiglycol, and the like; polyhydroxyl-containing phosphorus compounds such as those disclosed in U.S. Pat. No. 3,639,542, those prepared from alkylene oxides and phosphorus acids advantageously having a $P_2O_5$ equivalency of from about 72 percent to about 95 percent; polyacetals (acetal resins) such as products of formaldehyde or other aldehydes with a polyhydric alcohol or oxirane, those derived from acetone or cyclic acetals and the like; acids and amides of acids such as difunctional fatty acids and fatty acid alkanol amides, and diacids, including hydroxystearic acid, dihydroxystearic acid, lauroyl monoethanolamide, adipic acid, terephthalic acid, and sulfonamides and the like. Compounds obtained by reacting thiodiglycol alone or in combination with other glycols, dicarboxylic acids, formaldehyde, aminocarboxylic acids or amino alcohols to form polythio-mixed ethers, polythio-ether esters or polythio-ether ester amides exemplify the use of combinations of hydrogen-containing compounds that may be reacted to form active hydrogen components suitable for use in the invention.

Exemplary oxiranes suitable for preparation of the polyether polyols include ethylene oxide, propylene oxide, butylene oxide, amylene oxide, glycidyl ethers such as t-butyl glycidyl ether, phenyl glycidyl ether, and the like, as well as block or random copolymers of two or more of these oxiranes. Polyether polyols are also prepared from starting materials such as tetrahydrofuran and alkylene oxide copolymers with tetrahydrofuran; epihalohydrins such as epichlorohydrin; arylalkylene oxides such as stryrene oxide and the like. Preferably, the polyether polyols are prepared from alkylene oxides having from about two to about six carbon atoms such as ethylene oxide, propylene oxide, and butylene oxide. Polyether polyols suitable for use in the practice of the invention are preferably selected from the group consisting of copolymers produced from mixtures of ethylene oxide and propylene oxide, and polymers of propylene oxide at least partially capped with ethylene oxide to provide primary hydroxyl groups. The polyether polyols preferably have from about 2 to about 3 hydroxyl groups per molecule. The polyether polyols may be prepared by processes known to those skilled in the art such as those processes described in *Encyclopedia of Chemical Technology*, Vol. 7, pp. 257–262, Interscience Publishers (1951); M. J. Schick, *Nonionic Surfactants*, Marcel Dekker, New York (1967); British Patent No. 898,306; and U.S. Pat. Nos. 1,922,459; 2,871,219; 2,891,073; and 3,058,921.

Suitable hydroxyl-containing polyesters for use as relatively high equivalent weight active hydrogen compounds in the practice of the invention include those obtained from polycarboxylic acids or polycarboxylic acid anhydrides and polyhydric alcohols. The polycarboxylic acids and anhydrides are suitably aliphatic, cycloaliphatic, aromatic or heterocyclic; they are, optionally, substituted, e.g. by halogen atoms and are, optionally, unsaturated. Illustrative polycarboxylic acids include oxalic acid, malonic acid, succinic acid, glutaric acid, adipic acid, pimelic acid, suberic acid, azelaic acid, sebacic acid, oleic acid, trimellic acid, maleic acid, fumaric acid, glutaconic acid, alpha-hydro muconic acid, beta-hydromuconic acid, alpha-butyl-alpha-ethyl-glutaric acid, alpha-beta-diethylsuccinic acid, phthalic acid, isophthalic acid, terephthalic acid, hemimellitic acid, 1,4-cyclohexane-dicarboxylic acid and the like. Any suitable aromatic, aliphatic or heterocyclic polyhydric alcohol may be used. Exemplary polyhydric alcohols include ethylene glycol, 1,2-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, neopentyl glycol, 1,1,1-trimethylolethane, 1,1,1-trimethylolpropane, hexane-1,2,6-triol, tetraethyleneglycol, polypropylene glycol, alpha-methyl glucoside, pentaerythritol, sorbitol, quinitol, mannitol, and the like as well as compounds derived from phenols such as 2,2-(4,4'-hydroxyphenyl)propane, bis(4,4'-hydroxyphenyl)sulfide, bis(4,4'-hydroxyphenyl)sulfone and the like. Polyesters of lactones such as caprolactone and the like or hydroxycarboxylic acid such as hydroxycaproic acid and the like are also suitable active hydrogen containing components.

Other polyols suitable for use in the practice of the invention include polyacetones, hydroxy functional acrylic polymers such as polymers of hydroxyethyl acrylate, hydroxyethyl methacrylate, hydroxypropyl acrylate, hydroxypropyl methacrylate, and the like; polymers of ethylenically unsaturated carboxylic acids such as polymers of vinyl acetate like polyvinyl acetate and the like; hydroxyl-containing epoxy resins; urea-formaldehyde and melamine-formaldehyde resins; hydroxyl-containing polycarbonates, such as those prepared by the reaction of diols, such as 1,3-propanediol, 1,4-butanediol, 1,6-hexanediol, diethylene glycol, triethylene glycol or tetraethylene glycol, with diarylcarbonates, e.g. diphenylcarbonate, or phosgene; hydroxyl-containing polyurethanes; methylol resins; starches and other cellulosic polymers; esters of phosphoric, sulfonic, sulfuric and boric acid; polypeptides; polyamines such as polyethyleneimines, polypropyleneimines and condensation polymers of aniline and formaldehyde and the like; acrylamide polymers; amine-functional polyglycols; mercaptan-functional polyglycols and polyalkylene sulfides; carboxy-functional polymers such as polyacrylic acid and the like.

Representatives of the suitable polyols are generally known and are described in such publications as *High Polymers*, Vol. XVI, "Polyurethanes, Chemistry and Technology" by Saunder-Frisch, Interscience Publishers, New York, Vol. I, pp. 32–42, 44–54 (1962) and Vol. II pp 5–6, 198–199 (1964); *Kunststoff-Handbuch*, Vol. VII, Vieweg-Hochtlen, Carl-Hanser-Verlag, Munich, pp. 45–71 (1966); and Organic Polymer Chemistry by K. J. Saunders, Chapman and Hall, London, pp. 323–325 (1973); and *Developments in Polyurethanes*, Vol 1, J. M. Burst, ed., Applied Science Publishers (1978) pp. 1–76.

Polyols which contain high molecular weight addition or condensation polymers in a finely dispersed form or in solution are optionally used. Such polyols are obtained when polymerization reactions are carried out in situ in the polyols described above. Processes for the production of these polyols are described in U.S. Pat. Nos. 3,869,413; Re. 28,715; Re. 29,014; and Re. 29,118, which are incorporated herein by reference. For instance, polyethers may be modified with vinyl polymers, e.g., by the polymerization of styrene and/or acrylonitrile in the presence of the polyethers. Polyols having polyurethane or polyurea particles are also suitable. Polyols containing polymers or having polymer adducts are referred to as copolymer polyols.

Polyamines which are suitable for use as relatively high equivalent weight active hydrogen components in polyurethanes include polyether polyamines; polyester polyamines; amine-functional polymers such as amine functional acrylates, amine terminated acetal resins, amine terminated urethanes, amine containing polyesters, and the like. Blends of amines with polyols are also suitably used as active hydrogen components. When amines are used as at least a portion of the active hydrogen component, polyurea and polyureaurethane linkages are formed. Useful amines include polyoxyalkylene polyamines and cyanoalkylated polyoxyalkylene polyamines having molecular weights preferably from about 350 to about 10,000 and, more preferably, from about 400 to about 5000.

Amine-terminated polyethers are preferably used in the practice of the invention. Amine-terminated polyethers are prepared from the polyether polyols described above by amination thereof. Amination is described in U.S. Pat. Nos. 3,161,682; 3,231,619; 3,236,895; 3,436,359; 3,654,370 which are incorporated herein by reference. For amination, it is generally desirable that the terminal hydroxyl groups in the polyol be essentially all secondary hydroxyl groups for ease of amination. Secondary hydroxyl groups are introduced into a polyol produced from ethylene oxide by capping the polyol with higher alkylene oxides, that is, with alkylene oxides having more than two carbon atoms.

Generally, amination does not result in replacement of all the hydroxyl groups by amine groups. An aminated polyether polyol is selected to have a ratio of amine groups to hydroxy groups of from 0:1 to 1:0, depending on the physical properties desired in a resulting polyurethane. The amine groups are generally primary, but secondary amine groups may be formed. Beneficially, the amine-terminated polyols have an average molecular weight greater than about 200 and have an average of from about 2 to about 6 amine groups per molecule. In the case of amines, the term "functionality" is used herein to refer to the number of amine groups in the molecule. Advantageously, the amine-terminated polyols have an average molecular weight of at least about 350. Preferably, the aminated polyols have an average equivalent weight from about 1000 to about 2500. The process of utilizing aminated polyols disclosed in U.S. Pat. Nos. 4,530,941 and 4,444,910 illustrate processes for using such compounds. Those patents are incorporated herein by reference.

Particular relatively high equivalent weight active hydrogen components are selected to achieve properties desired in the polyurethane to be produced therefrom. Those skilled in the art know how to select active hydrogen compounds of the appropriate equivalent weight, and having the appropriate number and type of functional groups and other characteristics to achieve the desired properties. The relationship between the structure of the active hydrogen components and the properties of the resulting polyurethane is not significantly affected by the presence of the internal mold release compounds of the invention. The components may be, thus, used essentially in a conventional manner to form polyurethanes.

Generally speaking, when incorporated into polyurethanes, relatively high equivalent weight active hydrogen compounds produce segments of polymer called soft segments, which segments have relatively low glass transition temperatures. Relatively low glass transition temperatures are those generally below the temperatures of intended use of the polyurethane. Chain extenders in polyurethanes generally produce segments called hard segments, which are believed to align within the polymer to increase hardness over that of a polymer not having the hard segments. The amount and type of chain extender is generally chosen to achieve a desired hardness and other desired physical properties in a final polyurethane.

Chain extenders useful in the practice of the invention generally have at least two functional groups having active hydrogen atoms suitable for reaction with available isocyanate groups to crosslink or extend polymer chains produced from polyisocyanates and active hydrogen compounds. Chain extenders are preferably difunctional, that is, they have exactly two functional groups containing active hydrogen per molecule. Mixtures of difunctional and trifunctional compounds are also useful. Suitable chain extenders include primary and secondary diamines, amino alcohols, amino acids, hydroxy acids, diols, glycols or mixtures thereof. Exemplary compounds include ethylene diamine, hydroxy amines such as ethanolamine, propanol amine, diethanol amine and the like. A chain extender is generally chosen to achieve desired physical properties such as hardness, toughness, and the like, in the molded object.

Advantageous chain extenders include primary and secondary diamines which react readily with isocyanates. Such chain extenders include phenylene diamine, bis(3-chloro-4-aminophenyl)methane. 2,4-diamino-3,5-diethyl toluene, 2,6-diamine-3,5-diethyl toluene, trisecondary butanolamine, isopropanolamine, diisopropanolamine, N-(2-hydroxypropyl)ethylenediamine, N,N'-di(2-hydroxypropyl)ethylenediamine, dialkyl diaminobenzenes such as those disclosed in U.S. Pat. No. 4,526,905 and the like. Liquid mixtures of polyphenyl polymethylene-polyamines of the type obtained by condensing aniline with formaldehyde are also suitable, as are polyoxyalkylene polyamines such as those formed by aminating glycol initiated polyalkylene ethers, polyoxypropylene and the like. Amine chain extenders are generally sufficiently sterically hindered or chemically retarded to provide sufficient processing time in a RIM apparatus. Among diamine chain extenders, aromatic diamines having linear alkyl substituents of one to three carbon atoms in positions ortho to each amino group are generally advantageous.

Chain extenders having hydroxyl groups include low molecular weight aliphatic diols such as 1,4-butane diol, ethylene glycol, trimethylolpropane, diethylene glycol, 1,4-cyclohexanedimethanol, and the like: aromatic ring-containing diols such as bishydroxyethylhydroquinone, bisphenols, catechol, resorcinol and the like: amide or ester containing diols, amino alcohols and the like. Aliphatic diol chain extenders generally have a backbone of from 2 to 6 carbon atoms.

Aminated polyalkylene polyethers such as polyoxypropylene glycols and the like are particularly useful as chain extenders. Such polyalkylene polyethers beneficially have average amino hydrogen equivalent weights of from about 60 to about 110.

Chain extenders of different types are optionally used in combination. For instance, mixtures of 2-cyano-p-phenylene diamine and an aliphatic mono or dicarboxylic acid are used together in a process disclosed in U.S. Pat. No. 3,839,292. Enamines and aromatic diamines, optionally with a diol, are used in the process disclosed in U.S. Pat. No. 4,552,945. Preferable mixtures of chain extenders include mixtures of glycols and aromatic diamines: mixtures of aminated polyalkylene polyethers and aromatic diamines: mixtures of glycols and aminated polyalkylene polyethers: and the like which are disclosed in U.S. Pat. No. 4,269,945 which is incorporated herein by reference.

Chain extenders are generally used in quantities of about 2.5 to about 100 percent by weight, desirably from about 5 to about 50 percent by weight and advantageously from about 12 to about 50 percent by weight based on total weight of relatively high equivalent weight active hydrogen containing compounds used in a RIM process. Those skilled in the art are familiar with adjusting the amount of chain extender to achieve desired physical properties such as stiffness, flexibility and the like.

Polyisocyanate starting components suitable for use in the practice of the invention are organic compounds that contain at least two isocyanate groups. Such compounds are well known and readily available commercially. Polyisocyanate starting components include aromatic, aliphatic and cycloaliphatic polyisocyanates and combinations thereof. Representative polyisocyanates include diisocyanates, such as m-phenylene diisocyanate, toluene-2,4-diisocyanate, toluene-2,6-diisocyanate, hexamethylene-diisocyanate, tetramethylene-diisocyanate, cyclohexane-1,4-diisocyanate, hexahydrotoluene diisocyanate (and isomers thereof), naphthylene-1,5-diisocyanate, 1-methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate and the like: triisocyanates such as 4,4',4''-triphenylmethane triisocyanate, toluene-2,4,6-triisocyanate, and the like; tetraisocyanates such as 4,4'-dimethyldiphenylmethane-2,2',5,5'-tetraisocyanate, 4,4'-dicyclohexane-diisocyanate, isophorone diisocyanate, isomers of each and the like: as well as other polyisocyanates such as polyphenylisocyanate and the like and mixtures thereof. Toluene diisocyanate, diphenylmethane-4,4'-diisocyanate, diphenylmethane-2,4'-diisocyanate and polymethylene polyphenylisocyanate are beneficial for use in the practice of the invention because of their availability and properties.

Polyisocyanates are typically prepared by phosgenation of polyamine precursors. For instance, polyphenyl polymethylene polyisocyanate is prepared by phosgenation of a aniline/formaldehyde condensation product. Crude polyisocyanates are also suitable for use in the practice of the invention. Such crude isocyanates include crude toluene diisocyanates obtained by phosgenation of a mixture of toluene diamines or crude diphenylmethylene diisocyanate obtained by phosgenation of crude diphenylmethylenediamine. Crude isocyanates are disclosed in U.S. Pat. No. 3,215,652.

Diisocyanates useful in the practice of the invention are, optionally, derivatized to form prepolymers or quasi prepolymers. In general, a modified polyisocyanate useful in the practice of the invention has a free isocyanate content of from about 1 to about 40 percent by weight. To form prepolymers, diisocyanate starting components are reacted with less than a stiochiometric amount of active hydrogen-containing component. Suitable active hydrogen-containing components include low molecular polyols, such as dipropylene glycol, propylene glycol, hydroxy esters and the like, higher molecular weight polyols such as polypropylene glycol and the like, and amines and the like. Suitably, the diisocyanates are reacted with from about 0.01 to about 0.5 equivalents of a polyol having a molecular weight below about 700; beneficially, with about 0.015 to about 0.25 equivalents of polyols having a molecular weight from about 130 to about 300 in the case of such polyols as propylene glycol, butylene glycol, and the like or with a polypropylene ether glycol having a molecular weight of about 130 to about 700. Prepolymers suitable for use in the practice of the invention are disclosed in U.S. Pat. Nos. 4,374,210 and 4,297,440 which are incorporated herein by reference. Carbodiimide and uretonimine modified derivatives of diisocyanates, particularly diphenylmethane diisocyanates, which have been modified by the addition of high molecular weight polyols such as polyether diols and triols having molecular weights of from about 1000 to about 8000 are also useful in the process of the invention.

The polyisocyanate starting component is used in a quantity which provides an isocyanate index for the reaction mixture of from about 70 to about 130, preferably from about 90 to about 110. The isocyanate index is the ratio of the number of isocyanate groups in the polyisocyanate component and the number of isocyanate-reactive groups in the active hydrogen starting components multiplied by 100.

One or more catalysts are beneficially used in making polyurethanes. Suitable catalysts include tertiary amines, such as, triethylenediamine, N-methyl morpholine, N-ethyl morpholine, diethyl ethanolamine, N-coco morpholine, 1-methyl-4-dimethylaminoethyl piperazine, 3-ethoxy-N-dimethylpropylamine, N,N-dimethyl-N',N'-methyl isopropyl propylene diamine, N,N-diethyl-3-diethylaminopropylamine, dimethyl benzylamine, triethylamine, tributylamine, bis(N,N-diethylaminoethyl)adipate, 2-methylimidazole, 1,4-diaza-bicyclo-(2,2,2)-octane and the like. Other suitable catalysts include tin compounds such as stannous chloride, tin salts of carboxylic acids such as dibutyltin di-2-ethyl hexoate, dibutyl tin dilaurate, dibutyltin diacetate, di-2-ethylhexyltin oxide, and the like, as well as other organo-metallic compounds such as compounds of lead, arsenic, antimony and bismuth and compounds disclosed in U.S. Pat. No. 2,846,408 and the like. Silamines having carbon-silicon bonds such as those described in German Pat. No. 1,229,290 including 2,2,4-trimethyl-2-silamorpholine and the like as well as basic nitrogen compounds such as tetraalkylammonium hydroxides, alkali metal hydroxides such as sodium hydroxide, alkali metal phenolates such as sodium phenolate, and alkali metal alcoholates, such as sodium methylate, hexahydrotriazines and the like are also useful catalysts. Mixtures of catalysts ar also suitable.

Catalysts are generally used in a quantity of from about 0.001 to 10 percent by weight based on active hydrogen containing starting components. Those skilled in the art are able to select a catalyst composition to accelerate the reaction between starting components to an extent adequate to achieve a desirable gel time such that a starting component mixture solidifies in a time just sufficient to allow complete filling of the mold and to avoid faults in resulting molded objects. A desirable gel time is a function of the mold structure and temperature used in the process, but typically is about five to fifteen seconds. Solidification should, advantageously, be complete in less than about 5 minutes, preferably less than about 60 seconds and most preferably less than about 30 seconds from initial injection of starting components into the mold. Representative catalysts and details regarding their use are found in *Kunstoff-Handbuch*, Vol. VII, published by Vieweg and Hochtlen, Carl-Hanser-Verlag, Munich 1966, pp. 96–102. A catalyst is typically added to B-side components but is, alternatively, mixed with the A-side components.

Additives such as surface active agents, plasticizers, fillers, flame retardants, pigments, stabilizers such as antioxidants, fungistatic and bacteriostatic substances and the like are optionally used in polyurethanes. Those skilled in the art are able to select and use such additives without undue experimentation. Additives are generally blended with the active hydrogen starting components in the "B side" of the RIM apparatus.

The process of the invention is suitably used for producing compact moldings or moldings nucleated by incorporation of gases into one or more components of a polyurethane. In making such moldings, no blowing agent other than incorporated gas is generally used. Alternatively, blowing agents are used to produce moldings having a compact surface and cellular interior. Suitable blowing agents for use in the practice of the invention include inorganic blowing agents such as water, organic blowing agents which are volatile at temperatures in the mold, and dissolved inert gases. Suitable organic blowing agents include acetone: ethyl acetate: halogen substituted alkanes such as methylene chloride, chloroform, ethylidene chloride, vinylidene chloride, monofluorotrichloromethane, azobis(isobutyloformamide), chlorodifluoromethane, dichlorodifluoromethane and the like; butane; hexane; heptane; diethyl ether; and the like. Gases inert to the starting components such as nitrogen, air, carbon dioxide and the like are also useful blowing agents. Compounds such as azides which decompose at temperatures present in the mold to produce gases such as nitrogen are also useful.

Surface active additives, including emulsifiers, foam stabilizers, cell regulating additives and the like, are optionally used, especially when a cellular product is desired. Suitable emulsifiers include sodium salts of ricinoleic sulphonates or of fatty acids, amine salts of fatty acids such as oleic acid diethylamine, stearic acid diethanolamine and the like. Other surface active additives include such compounds as salts of sulphonic acids such as dinaphthylmethane disulphonic acid; fatty acids such as ricinoleic acid; polymeric fatty acids; and the like. Useful foam stabilizers include water soluble polyether siloxanes, such as those having a polydimethylsiloxane group attached to a copolymer of ethylene oxide and propylene oxide and the like. Such compounds are disclosed in U.S. Pat. No. 2,764,565. Cell regulating additives include paraffins or fatty alcohols or dimethylpolysiloxianes and the like.

The following examples are only for purposes of illustrating the process of the invention and are not to be viewed as limiting the present invention. All parts and percentages are on a weight basis unless otherwise indicated. In the examples, RIM molding is done in an Admiral 400 Hp RIM machine rated at 40 pounds per minute (18 kilogram per minute) maximum polymer through put when the weight ratio of A-side to B-side components is 1:1. The machine has two feed tanks of about 10 gallon or 38 liter capacity, referred to herein as the A side tank (for polyisocyanate components) and the B side tank (for active hydrogen components).

The mold cavity used in Examples 1–4 and Comparative Example A is in the shape of a rectangle measuring $12 \times 14 \times \frac{1}{8}$ inches ($4.7 \times 5.5 \times 0.28$ centimeters (cm)). The mold has a static side and a moving side. When the mold is closed, the static and moving sides form the rectangular cavity. Opening of the mold involves hydraulic separation of the moving side from the stationary side.

EXAMPLE 1

Fifty pounds (lb) (22.7 kilograms (kg)) of an triol initiated polyoxypropylene glycol end capped with ethylene oxide and having a molecular weight of about 5000: 3.8 lb (1.7 kg) of terminally aminated, diolinitiated polyoxypropylene having an average molecular weight of about 400, commercially available from Texaco under the trade designation Jeffamine ® D-400; and 9.7 lb (4.4 kg) of diethyl toluene diamine are poured into the B side tank of the RIM machine to form a B side mixture.

The B side mixture is heated to 100° F. (38° C.). Then 0.1 percent by weight based on total B side mixture each of dimethyl tin dilaurate, and of a 33 percent by weight based on total solution of triethylene diamine in dipropylene glycol are added as catalysts. After addition of catalysts, the B side mixture is mixed by stirring within the feed tank and recirculation at 100° F. (38° C.) for 15 minutes. Recirculation refers to a pumping of the mixture from low in the feed tank through tubing, following a path through the mixing head which prevents contact with A-side components and return to a higher position in the feed tank. Recirculation is then stopped for addition of 1.3 lb (0.6 kg) of antimony dialkyl dithiocarbamate, commercially available from R. T. Vanderbilt Company, Inc. under the trade designation Vanlube ® 73. Recirculation is resumed, and the temperature maintained at 100° F. (38° C.). A hard segment methylene diisocyanate prepolymer having an isocyanate equivalent weight of 179, commercially available from the Rubicon Division of Imperial Chemicals Incorporated under the trade designation Rubicon Isocyanate ® No. 179 is placed in the A side tank of the RIM machine and used in an amount corresponding to an index of 103 and an A/B ratio of 0.513. The prepolymer was stirred, recirculated and raised to a temperature of about 38° C. in the same manner as was the B-side component.

Both sides of the mold are stripped and cleaned of any residual wax or polymer remaining from previous use. Then each side is given a coating of waxy external mold release compound. A lighter coating is used than is typically used for molding without an internal mold release agent. The mold temperature is set to 155° F. (68° C.) and the mixing pressure is set to 2000 pounds per square inch (psi) (13,790 kilopascal (kPa)).

Injection of components from the A and B sides is begun and continued for a shot time of 1.2 seconds. One minute after injection ceases, the mold is opened and the molded rectangle is peeled from the mold. A light coating of wax is sprayed onto the static side of the mold, but not onto the moving side of the mold. Then the mold is closed, and another shot of A and B side components is injected. The process is repeated for a total of 20 consecutive moldings and demoldings. In each case, the molded rectangle is easily peeled even from the moving side of the mold.

EXAMPLE 2

The process of Example 1 is repeated except that 1.3 pounds (0.6 kilograms (Kg)) of zinc dibutyl dithiocarbamate is used as mold release agent in place of the antimony dialkyl dithiocarbamate in Example 1 and ten moldings are made. The ninth molded rectangle readily releases from the moving side of the mold.

EXAMPLE 3

The process of Example 1 is repeated except that the B side mixture comprises 65.1 parts by weight of the experimental polyoxypropylene glycol of Example 1 and 4.9 parts by weight of Jeffamine® D 400, 12.6 parts by weight diethyl toluene diamine and 1.75 parts by weight of a fifty percent by weight (based on weight of total solution) of zinc diamyl dithiocarbamate in a 100 SUS (Saybolt universal seconds) viscosity hydrocarbon oil, commercially available from R. T. Vanderbilt Company, Inc. under the trade designation Vanlube® AZ (as mold release agent in place of the antimony dialkyl dithiocarbamate in Example 1). Ten moldings are made. The tenth molded rectangle is easily removed from the mold.

EXAMPLE 4

The process of Example 1 is repeated except that 1.75 pounds (0.8 Kg) of nickel dibutyl dithiocarbamate, commercially available from R. T. Vanderbilt Company, Inc. under the trade designation Vanox® NBC is used as mold release agent in place of the antimony dialkyl dithiocarbamate in Example 1 and only four moldings are made. The fourth molded rectangle sticks to the mold, indicating that nickel dibutyldithiocarbamate is less active as an internal mold release agent than are other illustrated dithiocarbamate compounds. Although it sticks to the mold, the fourth rectangle has an excellent surface, that is, it appears to have a high degree of polish and absence of defects, tears, and pinholes.

COMPARATIVE EXAMPLE A: NOT AN EXAMPLE OF THE INVENTION

The process of Example 1 is repeated except that no internal mold release agent is used in place of the antimony dialkyl dithiocarbamate and only three injections are made. The third molded rectangle sticks to the mold.

These examples show that, whereas RIM molded polyurethane objects stick to a mold treated with only slight amounts of wax, polyurethanes containing the mold release agents of the invention are readily removed from molds treated with the same slight amounts of wax. Use of slight amounts of external mold release agent with the internal mold release agents of the invention exemplifies one way the internal mold release agents of the invention may be used. The invention encompasses use of the internal mold release agents of the invention with or without external mold release agents or other internal mold release agents.

I claim:

1. A method of making a reaction injection molded polyurethane having enhanced mold release properties comprising injecting into a mold cavity a formulation comprising:
   (a) at least one a polyisocyanate component:
   (b) at least one an active hydrogen component: and
   (c) an amount effective to enhance mold release properties of the polyurethane of at least one dithiocarbamate.

2. The method of claim 1 wherein the dithiocarbamate is a metal dithiocarbamate.

3. The method of claim 1 wherein the dithiocarbamate is a substituted metal dithiocarbamate.

4. The method of claim 1 wherein the dithiocarbamate is selected from the group consisting of alkylene dithiocarbamates, arylene dithiocarbamates and alkylarylene dithiocarbamates.

5. The method of claim 1 wherein the dithiocarbamate is of the formula:

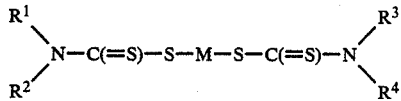

where $R^1$ and $R^4$ are independently selected from the group consisting of hydrogen, alkyl, aryl or alkylaryl groups which are unsubstituted or inertly substituted and have from one to forty carbon atoms, $R^2$ and $R^3$ are independently selected from the group consisting of unsubstituted or inertly substituted alkyl, aryl and alkylaryl groups of one to about forty carbon atoms, and M is a metal atom selected from the group consisting of antimony, copper, lead, and zinc.

6. The method of claim 5 wherein the metal atom, M, is antimony.

7. The method of claim 5 wherein $R^1$ and $R^4$ are both hydrogen and $R^2$ and $R^3$ are independently selected from the group consisting of unsubstituted or inertly substituted alkyl, aryl and alkylaryl groups of about four to about forty carbon atoms.

8. The method of claim 5 wherein $R^2$ and $R^3$ are both unsubstituted alkyl groups of from about 3 to about 20 carbon atoms.

9. The method of claim 1 wherein the formulation additionally comprises a second internal mold release agent.

10. The method of claim 9 wherein the second internal mold release agent is a zinc salt of a carboxylic acid.

11. The method of claim 9 wherein the second internal mold release agent is a silicon-containing compound.

12. The method of claim 5 wherein at least one active hydrogen component comprises a polyether polyol.

13. The method of claim 12 wherein the polyether polyol is admixed with at least one chain extender.

14. The method of claim 13 wherein the chain extender comprises an aromatic diamine.

15. The method of claim 1 wherein a least one polyisocyanate component is selected from the group consisting of 2,6-toluene diisocyanate: 2,4-toluene diisocyanate: diphenylmethane-4, 4'-diisocyanate; diphenylmethane-2,4'-diisocyanate, 4,4'-dicyclohexane diisocyanate, isophorone diisocyanate and mixtures thereof.

16. The method of claim 1 wherein the polyurethane has a density of at least 0.8 grams/cubic centimeter.

17. The method of claim 1 wherein the dithiocarbamate is used in an amount of at least about 0.25 percent by weight based on total active hydrogen component.

18. The method of claim 1 wherein the dithiocarbamate is used in an amount of from about 0.25 to 10 percent by weight based on total active hydrogen component.

19. A composition of matter comprising
(a) at least one active hydrogen component; and
(b) at least 0.25 parts by weight, based on 100 parts of total active hydrogen component, of a dithiocarbamate of the formula: where $R^1$ and $R^4$ are

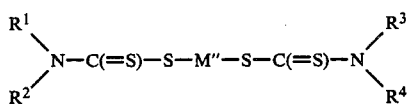

independently selected from the group consisting of hydrogen, alkyl, aryl or alkylaryl groups which are unsubstituted or inertly substituted and have from one to about forty carbon atoms; $R^2$ and $R^3$ are independently selected from the group consisting of unsubstituted or inertly substituted alkyl, aryl and alkylaryl groups of one to about forty carbon atoms, and M" is selected from the group consisting of substituted metal atoms and metal atoms selected from the group consisting of antimony, copper, lead, zinc, and mixtures thereof.

20. The composition of claim 19 wherein M is a metal atom selected from the group consisting of antimony, copper, lead and zinc.

21. The composition of claim 19 wherein M is an antimony atom.

22. The composition of claim 19 wherein $R^1$ and $R^4$ are both hydrogen; and $R^2$ and $R^3$ are independently selected from the group consisting of unsubstituted or inertly substituted alkyl, aryl and alkylaryl groups of about four to about forty carbon atoms.

23. The composition of claim 19 wherein $R^2$ and $R^3$ are both unsubstituted alkyl groups of from about 4 to about 20 carbon atoms.

24. The composition of claim 19 wherein the composition additionally comprises a second internal mold release agent.

25. The composition of claim 24 wherein the second internal mold release agent is a zinc salt of a carboxylic acid.

26. The composition of claim 24 wherein the second internal mold release agent is a silicon-containing compound.

* * * * *